United States Patent

Cantaloube

[11] Patent Number: 5,109,194
[45] Date of Patent: Apr. 28, 1992

[54] ELECTROMAGNETIC POSITION AND ORIENTATION DETECTOR FOR A PILOT'S HELMET

[75] Inventor: Christian Cantaloube, St Medard En Jalles, France

[73] Assignee: Sextant Avionique, Meudon La Foret, France

[21] Appl. No.: 620,650

[22] Filed: Dec. 3, 1990

[30] Foreign Application Priority Data

Dec. 1, 1989 [FR] France ................ 89 15881

[51] Int. Cl.⁵ .................................. G01B 7/14
[52] U.S. Cl. ..................... 324/207.17; 324/207.12; 324/225
[58] Field of Search ............ 324/202, 207.13, 207.17, 324/207.26, 225, 226, 227, 239, 243, 260, 262; 340/870, 32; 364/559, 731

[56] References Cited

U.S. PATENT DOCUMENTS

| | | | |
|---|---|---|---|
| 4,054,881 | 10/1977 | Raab | 324/227 X |
| 4,396,885 | 8/1983 | Constant . | |
| 4,613,866 | 9/1986 | Blood | 324/207.13 X |
| 4,642,786 | 2/1987 | Hansen | 324/207.17 X |
| 4,829,250 | 5/1989 | Rotier | 324/207.17 X |
| 4,849,692 | 7/1989 | Blood | 324/207.17 X |
| 4,945,305 | 7/1990 | Blood | 324/207.17 |

Primary Examiner—Kenneth A. Wieder
Assistant Examiner—Warren S. Edmonds
Attorney, Agent, or Firm—Oblon, Spivak, McClelland, Maier & Neustadt

[57] ABSTRACT

An electromagnetic position and orientation detector. A determination is made by a calculator of the position and the orientation of a mobile sensor as a function of the coupling coefficients measured between each of the coils of the sensor and each of the coils of a transmitter. These measurements are tainted with errors due to the imperfections in gain of the various elements of the transmission and reception channels. To eliminate these errors, a stationary sensor is used whose coupling coefficients with the coils of the transmitter are measured to serve as a reference to correct the coupling coefficients between the coils of the transmitter and of the mobile sensor.

1 Claim, 2 Drawing Sheets

ELECTROMAGNETIC POSITION AND ORIENTATION DETECTOR FOR A PILOT'S HELMET

BACKGROUND OF THE INVENTION

1. Field of the Invention

This invention relates generally to an electromagnetic detector designed to identify the position and orientation of a mobile body in a given space and more particularly to identify the exact position, in an aircraft, of the pilot's helmet, equipped with a helmet sight.

2. Discussion of the Background

An electromagnetic position and orientation detector generally includes a stationary transmitter with three coils that are excited alternately by a generator and a mobile sensor with three coils, each of which receives an induced signal relative to the excitation of each of the coils of the transmitter. A calculation means connected to the coils of the sensor make it possible to determine the position and orientation of the sensor as a function of the induced signals. In the case of identifying the position of the helmet in an aircraft, the cockpit of the aircraft constitutes the given space and the helmet constitutes the mobile body.

Such detectors are described, for example in French patent 2 458 838 and U.S. Pat. No. 4,396,885. To determine the position and orientation of a mobile body in a space, the transmitter occupies a stationary place in the space and the sensor is attached to the mobile body. At each position of the body, for each coil of the sensor, three signals occur which are induced respectively by the three coils of the transmitter. Thus, altogether nine induced signals are used to calculate the position and direction of the body.

This calculation is tainted with errors due to the imperfections of the channels that go from the electric excitation generator to the calculation means. Actually, these channels exhibit imperfections of gain both in transmission and in reception, including inaccuracies, non-linearities and drifts.

U.S. Pat. No. 4,054,881 discloses how to make an electromagnetic position and orientation detector with, in addition to a mobile sensor, a stationary antenna whose induced signal is used to produce a negative feedback in the transmission channels to keep the level of the electromagnetic field created by the transmitter constant. Such a device can eliminate the errors of the transmission channels, but has no effect on errors due to imperfections of gain which affect the elements located from (and including) the sensor up to (not including) the calculation means.

SUMMARY OF THE INVENTION

An object of this invention is to reduce the drawbacks of prior art detectors.

Another object of this invention is to accurately determine the position and orientation of a mobile body in a given space.

A further object of this invention is to eliminate errors in the transmission channels of a position and orientation detector.

This is obtained by using a stationary sensor whose signal is used as a reference signal, during calculations, to correct errors introduced in the nine induced signals.

According to this invention, there is provided an electromagnetic position and orientation detector comprising an electric excitation generator, a stationary transmitter with three coils connected to be excited alternately by the generator, a mobile sensor with three coils, said sensor being electromagnetically coupled to the transmitter to supply by each of its coils an induced signal relative to the excitation of each of the coils of the transmitter, calculation means connected to the coils of the sensor to make calculations to determine, as a function of the induced signals, the position and orientation of the sensor, and, to take into account the inaccuracy of the gains on the signals between the generator and the calculation means, a stationary sensor electromagnetically coupled between the electric generator and the calculation means, for supplying a reference signal to the calculation means to correct the calculations made from the induced signals.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
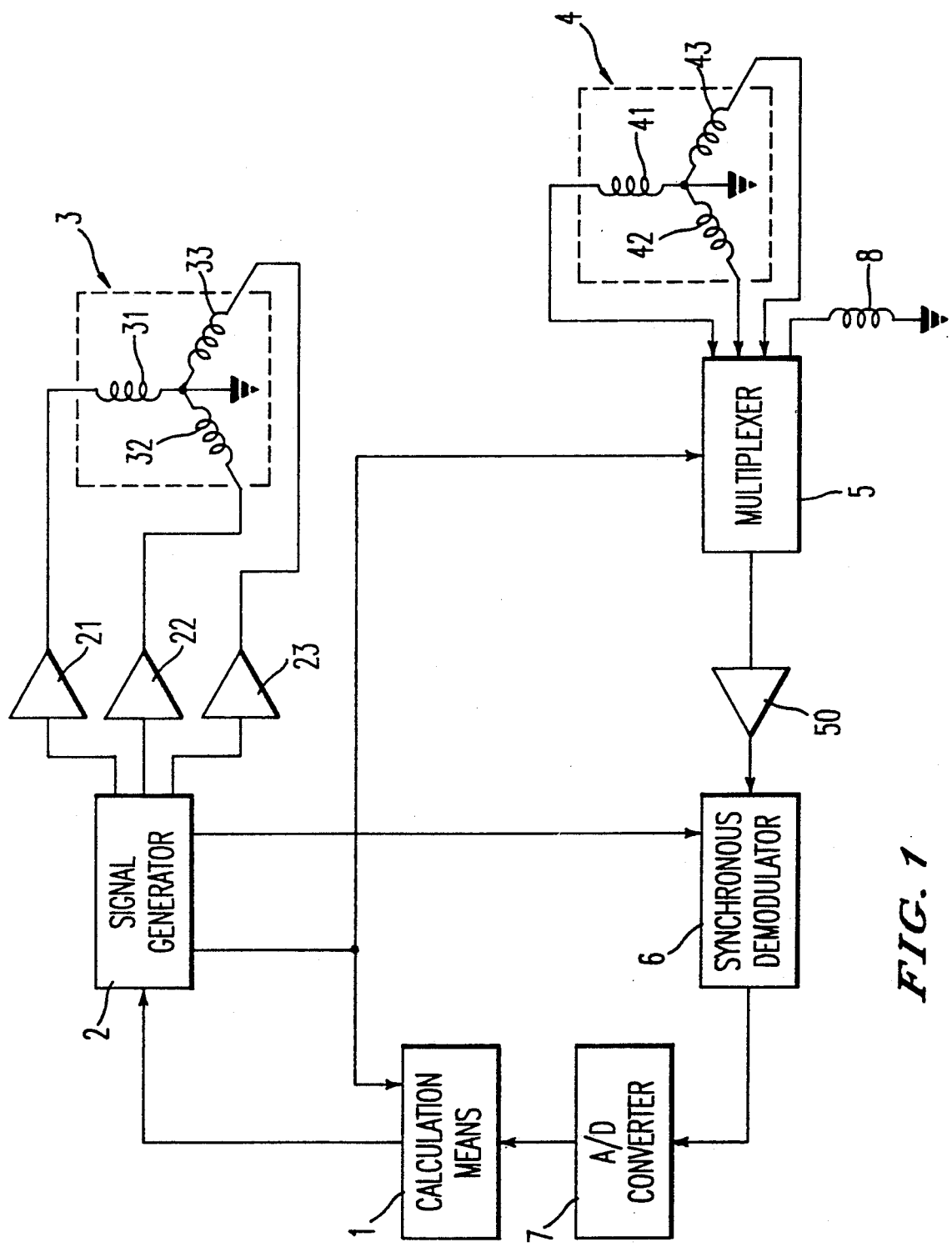
FIG. 1 is a diagram of an embodiment of a detector according to the present invention.

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 1 shows the electromagnetic position and orientation detector according to the present invention based on a known detector. The operation of such a prior art detector can be shown by reference to FIG. 1 by ignoring element 8 which is specific to the invention.

Position and orientation detectors of a solid in a space, using an electromagnetic coupling between a stationary transmitter and a mobile sensor consist mainly of the following:

An electric signal generator 2, to deliver excitation signals and a partition signal.

A stationary transmitter 3 having three amplifiers 21, 22, 23 which receive the signal from generator 2 and generating in space, in an identifiable way, three independent magnetic field vectors $\vec{B1}$, $\vec{B2}$, $\vec{B3}$. Here the term independent means that the directions of the fields are distinct and that the fields are not all three contained in the same plane.

A mobile sensor 4, placed at a point in the space and which receives on three independent axes the three fields created by the transmitter.

. A device for processing the three field components induced in each of the three magnetic field vectors in sensor 4. There are therefore nine components to be processed to determine the position and the orientation of the sensor at a given instant.

Transmitter 3 and sensor 4 are most often made from triplets 31, 32, 33 and 41, 42, 43 of orthogonal coils between them, placed along the axes, not shown, of pitch, roll and yaw.

The processing device comprises most generally, in series from the outputs of sensor 4: a multiplexer, 5, an amplifier, 50, a synchronous demodulator, 6, an analog-to-digital converter 7, and calculation means 1, which may be part of a microprocessor. The calculation means 5 triggers signal generator 2 which supplies an excitation signal to feed successively coils 31, 32, 33 of the transmitter, during successive feed cycles. A cycle partition signal, formed from a cycle starting pulse followed by nine pulses regularly distributed in the period of a cycle, is supplied by generator 2 to a control input of multiplexer 5. The latter can thus connect separately and successively the three coils 41, 42, 43 of sensor 4, to the input of amplifier 50 during the time when a coil of the transmitter is fed during a cycle. During a cycle, multiplexer 5 thus delivers nine signals corresponding to the signals induced successively by the three coils of transmitter 3 in each of the three coils of sensor 4.

Synchronous demodulator 6 performs a demodulation of the signals supplied by amplifier 50, thanks to the excitation signal that generator 2, as soon as it is triggered, delivers to it constantly. The partition signal is also supplied to calculation means 1 to make it possible for it to recognize the source of the signals which reach it through converter 7.

There are two main methods of obtaining the position and orientation of the sensor in relation to the transmitter.

The first method uses the laws of electromagnetism which give formulas for predicting the fields created at all points.

The characteristic values $\vec{B1}.\vec{B2}$, $\vec{B1}.\vec{B3}$, $\vec{B2}.\vec{B3}$, $\vec{B1}.\vec{B1}$, $\vec{B2}.\vec{B2}$, $\vec{B3}.\vec{B3}$, which do not depend on the rotation of the sensor but only on its position, are calculated from the nine field measurements. Thanks to these six parameters and to the laws of electromagnetism, the position of the sensor in relation to the transmitter is calculated.

Knowing this position, the nine components of the fields are calculated in the identification of the transmitter. The comparison of these nine components to those seen by the sensor gives the relative rotation of the sensor in relation to the transmitter.

The second method uses a prior experimental reading of the fields in the space, with a sensor having a clearly defined orientation, which makes it possible to overcome distortions due either to metallic masses present nearby, or to imperfections of the transmitter and sensor in relation to the electromagnetic theory.

In both methods, the accuracy of the links of transmission, reception and measurement directly influence the accuracy of the values obtained for the position and orientation.

The detectors described below make it possible to overcome this drawback. They can be used with one or the other of the two previously cited position and orientation extracting methods. They require simply that the differences in makeup between the coils of the receiver and the reference coil are either negligible or measured and otherwise known.

The detector, as it is drawn in FIG. 1, is distinguished from a standard detector by the addition of a stationary sensor 8 made with a coil whose position and orientation are known with precision in the pitch, roll and yaw axes of transmitter 3.

The coil of stationary sensor 8 is processed in the same way as coils 41, 42, 43 of mobile sensor 4. That is, its induced signal is supplied to multiplexer 5. Multiplexer 5, therefore, has one more signal input than the corresponding multiplexer of a standard detector. The partition signal that it receives from signal generator 2 is then formed from a cycle starting pulse followed by, not nine, but twelve pulses regularly distributed in the period of a cycle, since each time that one of the three coils of transmitter 3 is excited, the induced signals in the four sensor coils must be successively measured.

The measurement of the induced signal in stationary sensor 8, compared with the theoretical value that this signal should have because of its position and its orientation in the first method described above, or compared with the value of the induced signal in sensor 8 during the experimental reading of the fields in the second method described above, makes it possible, in the nine measurements made per cycle with the mobile sensor, to correct the errors due to the links of transmission, reception and measurement. The way to proceed to make these corrections is described below, considering two cases.

The first case is the one where the detector according to FIG. 1 is linear both in its three transmission channels and in it measurement channel and where, at the moment of the measurement, the reception channel exhibits a gain error Gr and each transmission channel a gain error Gej, where j is the reference number of the transmitter coil of that channel minus 30. To simplify the following, coils $j=1$, 2 and 3 will be respectively coils 31, 32, 33 of transmitter 3 while coils $i=1$, 2, and 3 will be respectively coils 41, 42 and 43 of mobile sensor 4.

Each calculation of magnetic coupling Mij between the coil of channel j at transmission and coil $i=1$, 2 or 3 of sensor 4, is therefore tainted by an overall gain error Gej.Gr. Now, the calculation of coupling M4j between the fourth coil, i.e., that of stationary sensor 8, and the coil of channel j is tainted by the same error Gej.Gr. These calculated magnetic couplings can, therefore, be written:

$$Mij = Gej.Gr.M'ij$$

$$M4j = Gej.Gr.M'4j$$

In these formulas M'ij and M'4j are the true values of the magnetic couplings under consideration. Thus, the true value to be taken into account, in the calculations, to determine the position and orientation of mobile sensor 4, is written:

$$M'ij = Mij.M'4j/M4j$$

M'ij can therefore be calculated since Mij and M4j are calculated and since, in the first method of determination explained above, M'4j will be the theoretical value of the coupling calculated for sensor 8, while, in the second method, this will be the value read during the experimental measurement of the fields.

The second case to be considered is the one where the detector is not linear in its transmission and measurement channels. In this case, if ej is the level controlled on coil j of the transmitter, the actual transmission level is $e'j = fj(ej)$ where fj is a function. Also, if ri is the level actually received on coil i of sensor 8, the reception level, as it is seen, i.e., as it will be taken into account in the calculations, can be written $r'i = g(ri)$ where g is a function.

By taking as models of functions fj and g, the polynomials $$e'j = bj.ej + cj.ej^2 + ...$$

and $$ri = a + b.r + c.ro^2 + ...;$$

and by introducing there $ri = Mij.e'j$
it occurs $$r'i = a + b.bj.Mij.ej + b.cj.Mij.ej^2 +$$

$$c.Mij^2.(bj^2.ej^2 + cj^2.ej^2 + 2\, bj.cj.ej^2) + ...$$

In this formula, it appears that the coefficient of order 1 of the function $r'i = hij(ej)$ and which will be called Kij, is homogeneous with gain error Gej.Gr in the case where the detector is linear:

$$kij = b.bj.Mij$$

Consequently the detector is used as indicated below.

By successive transmissions at different levels ej, the coefficients of order 1 of the functions hij and h4j, i.e., kij and k4j, are determined.

In the case of the first method, the knowledge of m4j makes it possible to determine the gain error b.bj:

$$b.bj = k4j/M4j$$

and $$Mij = kij/b.bj = kij.M4j/k4j$$

In the case of a processing by experimental reading of the field, k'4j initially read and compared to the value k4j measured in use makes it possible to find the relative error between the two series of measurements, hence:

$$Mij = kij.k'4j/k4j$$

Figure 2:
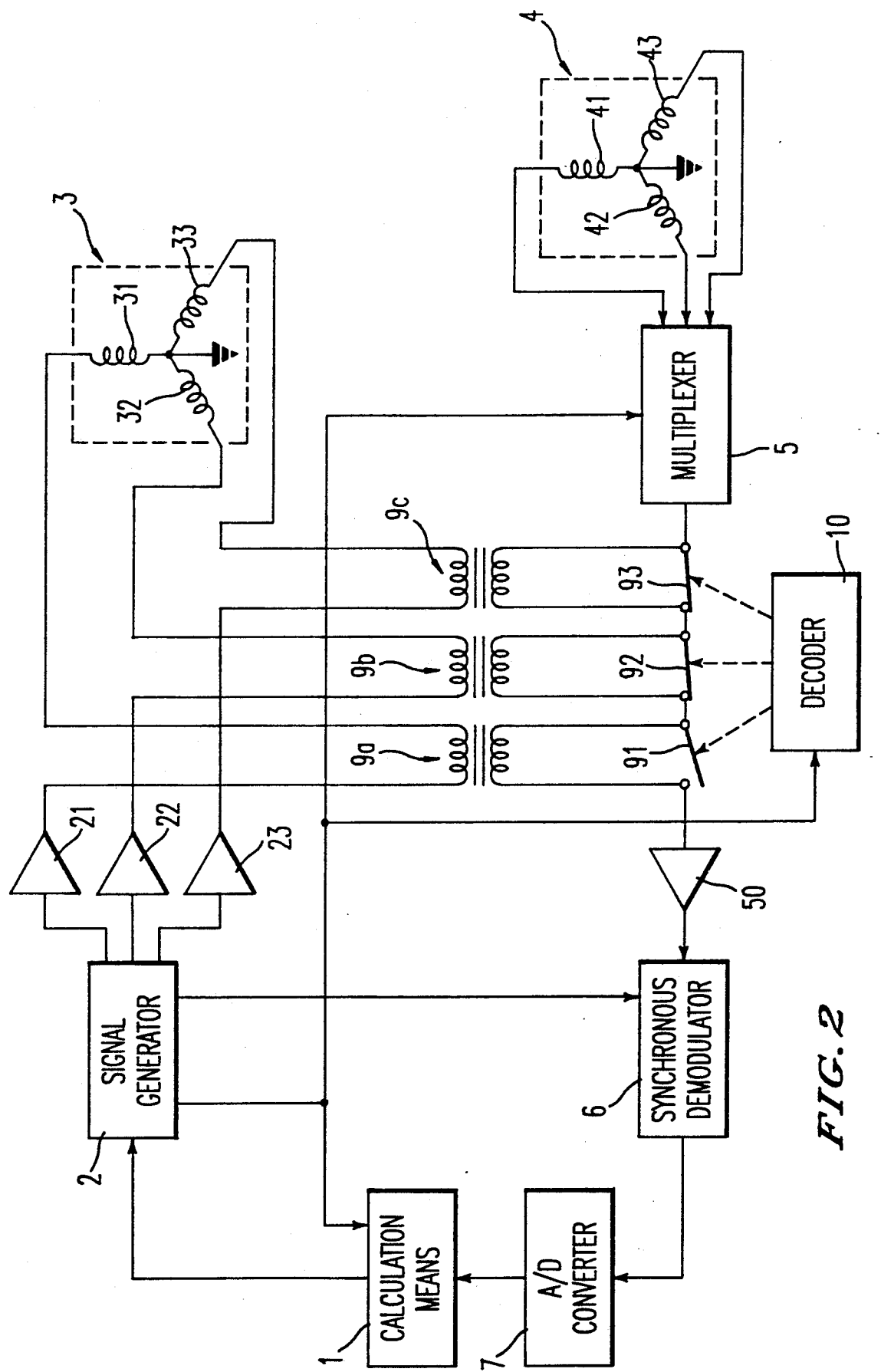
FIG. 2 is a diagram of a second embodiment of a detector according to the present invention.

FIG. 2 is a diagram of a detector according to the invention in which the measurement reference, instead of being given by a stationary sensor in free field such as sensor 8 of FIG. 1, is given by three transformers 9a, 9b, 9c. The primary windings of these transformers are mounted in series with the coils of a transmitter 3 similar to the one of FIG. 1, for example the primary winding of transformer 9a with coil 31. The secondary windings of these transformers are mounted in series between the output of a multiplexer 5 and the input of an amplifier 50. These two circuits are similar to circuits 5 and 50 of FIG. 1 except that the multiplexer requires only three input signals. Switches 91, 92, 93 are mounted in parallel respectively on the secondary windings of these transformers and are controlled by the partition signal which was already mentioned during the description of FIG. 1. The rest of the circuit is identical to FIG. 1.

In the assembly according to FIG. 2, the partition signal is formed from a cycle starting pulse followed no longer by twelve but by eighteen pulses regularly distributed in the period of the cycle. In these eighteen successive pulses, the nine odd pulses are used, by multiplexer 5, as in the case of the prior art standard detector described above. That is, they are used for time division multiplexing of the induced signals in each of the coils of mobile sensor 4 by each of the coils of transmitter 3. The 9 even pulses are used by a decoder 10 to control the turning off of one and only one of switches 9a, 9b, 9c. This turning off of a switch occurs during half of the period which occurs when an excitation signal applied to the coil of transmitter 3 which is in series with the primary of the corresponding transformer.

The additional coupling coefficients Kj, with j = 1, 2 and 3, brought respectively by transformers 9a, 9b, 9c, make it possible to eliminate the gain error and thus to determine the true value M'ij of the magnetic coupling between coil j of the transmitter and coil i of the sensor, i and j having the same meanings as in the explanations relative to FIG. 1. By using the same references as the ones used during calculations relating to FIG. 1, it actually occurs, during the measurement with transformer $$ri1 = (Kj + M'ij)\, Gej.Gr.ej$$

and without transformer $$ri2 = M'ij.Gej.Gr.ej$$

hence $$ri1 - ri2 = Kj.Gej.Gr.ej$$

$$Gej.Gr.ej = (ri1 - ri2)/Kj$$

which gives $$M'ij = Kj.ri2/(ri1 - ri2)$$

Thus, since Kj is known and ri1, ri2 is obtained by the calculation, the true value M'ij of the coupling coefficient between coil j of transmitter 3 and coil i of sensor 4 can be calculated by calculation means 1.

This invention is not limited to the examples described. In particular, the assembly according to FIG. 2 can be modified by placing the secondaries of transformers 9a, 9b, 9c not in series on the output of multiplexer 5 but by connecting each one to an input of a multiplexer 5 which has six signal inputs. The partition signal should then comprise, per cycle, one cycle starting pulse and twelve pulses regularly distributed in the period of the cycle. Thus, while one of the coils of transmitter 3 receives the excitation signal of generator 2, taken into account successively are the induced signals in the three coils of mobile sensor 4 and in the secondary of the transformer whose primary receives the excitation signal, i.e., whose primary is in series with that coil of the transmitter which is excited.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. An electromagnetic position and orientation detector comprising:
   an electric excitation generator;
   a stationary transmitter with three coils connected to be excited alternately by said generator;
   a mobile sensor with three coils, said sensor being electromagnetically coupled to the transmitter so that a signal is induced in each of its coils relative to the excitation of each of the coils of the transmitter;
   calculation means connected to the coils of the sensor to determine, as a function of the induced signals, the position and orientation of the sensor;

a stationary sensor connected by electromagnetic coupling between the electric generator and the calculation means, to supply a reference signal to the calculation means wherein said calculation means determines errors in the signal gain based on the reference signal, including three transformers each having a primary winding and a secondary winding, the primary windings of the three transformers being connected in series respectively with the three coils of the transmitter and the secondary windings of the three transformers being connected in series between the mobile sensor and the calculation means; and three switches connected in parallel respectively to the three secondary windings, each switch being turned on to short circuit the winding to which it is parallel, during a part of the time when the corresponding coil supplies the induced signal, each secondary winding thus supplying a reference signal during the time when the corresponding switch is turned off.

* * * * *

UNITED STATES PATENT AND TRADEMARK OFFICE
CERTIFICATE OF CORRECTION

PATENT NO. : 5,109,194

DATED : April 28, 1992

INVENTOR(S) : CHRISTIAN CANTALOUBE

It is certified that error appears in the above-identified patent and that said Letters Patent is hereby corrected as shown below:

In column 5, line 13, the equation should read
$--c.M_{ij}^2.(b_j^2.e_j^2+c_j^2.e_j^4+2\ b_j.c_j.e_j^3)+...--;$ line 33, the equation should read
$--M_{ij} = k_{ij}/b.b_j = k_{ij}.M_{4j}/k_{4j}--.$ Signed and Sealed this Ninth Day of November, 1993

Attest:

BRUCE LEHMAN

Attesting Officer     Commissioner of Patents and Trademarks